(12) United States Patent
Sorstedt et al.

(10) Patent No.: US 10,436,599 B2
(45) Date of Patent: Oct. 8, 2019

(54) METHOD FOR GENERATING NAVIGATION DATA AND A NAVIGATION DEVICE FOR PERFORMING THE METHOD

(71) Applicant: VOLVO CAR CORPORATION, Gothenburg (SE)

(72) Inventors: Joakim Lin Sorstedt, Gothenburg (SE); Alexander Schafer, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 245 days.

(21) Appl. No.: 15/486,334

(22) Filed: Apr. 13, 2017

(65) Prior Publication Data

US 2017/0307397 A1    Oct. 26, 2017

(30) Foreign Application Priority Data

Apr. 22, 2016    (EP) .................... 16166511

(51) Int. Cl.
| | |
|---|---|
| *G01C 21/32* | (2006.01) |
| *G01C 21/36* | (2006.01) |
| *B60W 30/12* | (2006.01) |
| *B60W 40/06* | (2012.01) |
| *G05D 1/00* | (2006.01) |

(Continued)

(52) U.S. Cl.
CPC ......... *G01C 21/3644* (2013.01); *B60W 30/12* (2013.01); *B60W 40/06* (2013.01); *G01C 21/32* (2013.01); *G05D 1/0088* (2013.01); *G05D 1/024* (2013.01); *G05D 1/0278* (2013.01); *G06K 9/00798* (2013.01); *B60W 30/18163* (2013.01); *B60W 2420/40* (2013.01); *B60W 2420/52* (2013.01); *B60W 2420/54* (2013.01); *B60W 2520/10* (2013.01); *B60W 2520/14* (2013.01); *B60W 2540/18* (2013.01); *B60W 2750/40* (2013.01); *G01S 19/13* (2013.01); *G05D 2201/0213* (2013.01); *G08G 1/0112* (2013.01);

(Continued)

(58) Field of Classification Search
CPC ... G01C 21/3644; G01C 21/32; B60W 40/06; B60W 30/12; G05D 1/0278; G05D 1/024; G05D 1/0088; G06K 9/00798
USPC .......................................................... 701/25
See application file for complete search history.

(56) References Cited

U.S. PATENT DOCUMENTS

| | | | |
|---|---|---|---|
| 2007/0143004 A1 | 6/2007 | Sakuma | |
| 2010/0121569 A1* | 5/2010 | Nakamura | ............ G01C 21/30 701/532 |

(Continued)

FOREIGN PATENT DOCUMENTS

JP    2004271513 A    9/2004

OTHER PUBLICATIONS

Extended European Search Report dated Nov. 8, 2016, Application No. 16166511.2-1557, Applicant Volvo Car Corporation, 10 Pages.

*Primary Examiner* — Nadeem Odeh
(74) *Attorney, Agent, or Firm* — Brooks Kushman P.C.

(57) ABSTRACT

A method for generating navigation data for a vehicle using a vehicle and a navigation device, said vehicle comprising a set of sensors, said method comprising the steps of: travelling along a road, detecting at least one landmark, determining if said at least one landmark has a shape correlating to the main direction of said road. Approving the at least one landmark as a landmark for landmark navigation or approving an associated section of the road for landmark navigation.

15 Claims, 6 Drawing Sheets

(51) Int. Cl.
  *G06K 9/00*   (2006.01)
  *G05D 1/02*   (2006.01)
  *B60W 30/18*   (2012.01)
  *G01S 19/13*   (2010.01)
  *G08G 1/01*   (2006.01)

(52) U.S. Cl.
  CPC ......... *G08G 1/0129* (2013.01); *G08G 1/0141* (2013.01)

(56) References Cited

U.S. PATENT DOCUMENTS

| | | |
|---|---|---|
| 2010/0295668 A1 | 11/2010 | Kataoka |
| 2013/0218448 A1 | 8/2013 | Suzuki |
| 2014/0111369 A1 | 4/2014 | Oh et al. |
| 2014/0163878 A1 | 6/2014 | Asano |
| 2014/0306844 A1* | 10/2014 | Kim ..................... G01S 13/867 342/385 |
| 2014/0379254 A1* | 12/2014 | Miksa ................... G01C 21/32 701/450 |
| 2017/0327118 A1* | 11/2017 | Masui ................... B60W 30/10 |

\* cited by examiner

METHOD FOR GENERATING NAVIGATION DATA AND A NAVIGATION DEVICE FOR PERFORMING THE METHOD

CROSS-REFERENCE TO RELATED APPLICATIONS

This application claims foreign priority benefits under 35 U.S.C. § 119(a)-(d) to European patent application number EP 16166511.2, filed Apr. 22, 2016, which is incorporated by reference in its entirety.

TECHNICAL FIELD

The present disclosure relates to a method for generating navigation data for a vehicle. The vehicle may be an autonomous vehicle, a driver supervised self-driving vehicle or driver supervised vehicles with automatic steering control for example. The method uses existing landmarks and correlates the shape of the landmark with the shape of the road in order to approve or disapprove a landmark for landmark navigation, and to form a database based on the data.

BACKGROUND

Vehicle drivers have over the last decades been assisted by GPS navigation. GPS navigation provides navigation data which can be superposed on a map and readily simplifies the maneuvering in otherwise uncharted territories for the driver. With the introduction of autonomous vehicles, the demand for improved navigation data as well as improved additional navigation systems has increased. Just as a matter of example, the GPS signal is not always available. In urban environment for example, the GPS signal may be blocked by high buildings.

Additional navigation data can be collected using road side lines and center lines, sometimes also referred to as road lane markings. Cameras may be used to detect and track the position of the vehicle with respect to the closest road side line for example. Navigating using the road side lines has its drawbacks however. Snow and dirt may cover the road side lines, making them more difficult to detect. In some sections of a road, the road side lines may be worn down to such an extent that they are nearly impossible to detect.

Landmark navigation is a navigation method in which landmarks are used to identify the position of the vehicle. The US patent application Ser. No. US 2014/0163878 A1 disclose an in-vehicle navigation apparatus which comprises a landmark information acquiring unit. The system further includes a lane guide unit. The apparatus assists in determining the appropriate lane in which the user should drive. The landmark information acquiring unit acquires landmark information representing an object which serves as a landmark. The lane at which the vehicle is permitted to travel is restricted at the specific point, defined by the landmark. The landmark functions as a trigger and basically; a driver receiving the guidance is capable of appropriately performing the driving operation to change to the guided lane by using the confirmation of the object existing along the route as a trigger event.

The above mentioned in-vehicle navigation apparatus suffer from some drawbacks however. The in-vehicle navigation apparatus does not provide navigation data which is reliable enough for autonomous driving. Further, the system appears to be limited to the selection of lanes.

It appears that there is a need for improved navigation units and methods for gathering navigation data.

SUMMARY

It is an object of the present disclosure to provide a solution to the above-mentioned drawbacks, or to at least partly provide a solution, or to at least provide a useful alternative. The object is at least partly met by a method for generating navigation data for a vehicle using a vehicle and a navigation device. The vehicle comprising a set of sensors, the method comprising the steps of travelling along a road, detecting at least one landmark, determining if the at least one landmark has a shape correlating to the main direction of the road and approving the at least one landmark as a landmark for landmark navigation or approving an associated section of the road for landmark navigation.

The method is advantageous when applied on multiple vehicles to form a data base having approved landmarks. The method is preferred when using a crowdsourcing gathering process. Multiple readings of landmarks and assessing the readings to approve or optionally not approve the landmarks provide reliable navigation data for vehicles. The method is further advantageous when used with autonomous vehicles. If the shape of the landmark can be correlated to the shape of the road, the landmark may be used for navigation enabling e.g., an autonomous vehicle to follow the main direction of the road based on the data input from the sensors sensing characteristics of the landmark such as the distance to the landmark.

Preferably the main direction of the road is the direction which a driver would travel to stay substantially in the middle of the lane in which the vehicle was travelling in.

The method may comprise the step of: storing the at least one landmark, or the associated section of the road, in a data base, cloud, or on a storage unit. By storing the approved landmark or the associated section of the road, other vehicles may take part of that information and over time, a data base is formed having a significant amount of approved or optionally not approved landmarks, enabling users to access a comprehensive data base.

The method may comprise the step of: when at least one landmark is determined not to have a shape correlating to the main direction of the road, storing the at least one landmark, or associated section of the road, as inappropriate for landmark navigation. If a landmark is deemed not suitable for landmark navigation, the landmark may be tagged as not suitable for landmark navigation. A second vehicle may thus be made aware of that upcoming landmarks are unsuitable for landmark navigation and the navigation device may be prevented from relying on the data gathered from the landmark. Optionally or additionally, the second vehicle may be made aware of that the specific section of the road ahead is unsuitable for landmark navigation. The method can thus be adapted to generate both approvals, i.e., positive identifications, or disapprovals, i.e., negative identifications. In general terms, landmarks in a data base may be made active or inactive for landmark navigation.

When determining if the at least one landmark has a shape correlating to the main direction of the road, basically this means that the shape of the road can be correlated with the shape of the landmark. A curved landmark may indicate a corresponding curved road. The correlation may thus be that the shape of the landmark follows the main direction of the road. Optionally, it may be that the correlation may be adjusted using a coefficient or an algorithm for correlating the shape of the road to the shape of the landmark. The landmark may optionally or additionally be identified using a distance profile of the landmark from the vehicle and/or road.

The landmark may be at least one landmark selected from the list of: guardrails, road barriers, road safety fences, vehicle restraint systems, road concrete blocks, buildings, streetlights, buildings, walls, road lane markings. It is believed that the method is readily applicable on stationary objects which by its nature are positioned close to roads but may not always correlate to the main direction of the road. Just a matter of example, road barriers are landmarks that along some sections follow the main direction of the road, i.e., if the road turns the road barrier turns with the road, when the road is straight, the road barrier runs parallel with the road. However, there are sections of a road that road barriers deviate from the main direction of the road in such a manner that they are inappropriate to navigate by, or impossible to navigate by, as they do not indicate the characteristics of the road.

The main direction of the road may be determined using side lines, center lines, GPS data, vehicle data such as yaw rate, vehicle speed, steering angle, etc. There are many ways to estimate the main direction of a road. The vehicle sensors may detect the road side lines for example and based on the assumption or knowledge that the road side lines correspond to the main direction of the road; the road side lines may be enough to determine the main direction of the road. Similar apply on road center lines. Based on GPS data, characteristics of the section of the road along which the vehicle travels may be determined. It is also possible to determine the main direction of the road based on how the vehicle drives. It is reasonable to assume that a driver drives in the center of the lane, and thus substantially follows the main direction of the road. Hence also vehicle data may be used to determine the main direction of the road. Combination of the above is of course possible.

The main direction of the road may be directly correlating to the shape of the landmark, or be correlated to the shape of the landmark via a detected correlation such as a coefficient or distance profile. The correlation between the main direction of the road and the shape of the landmark may be a direct correlation in terms of that the landmark strictly follows a contour of the road, or main direction of the road. Optionally the correlation between the main direction of the road and the shape of the road may be indirectly related in terms of the shape of the road may be derived from the readings on the landmark via a stored key. The key could be a coefficient, an equation, a distance profile or similar. Using the stored key, the readings from the landmark can be convertible to the shape of the road. It may further be possible to add GPS data and/or additional sensor readings to provide a key for correlating the readings on the landmark.

The generated navigation data is preferably used for, or used by, autonomous vehicles, autonomous vehicle navigation, driver supervised self-driving vehicles, driver supervised self-driving vehicle navigation, driver supervised vehicles with automatic steering control and/or driver supervised vehicles with automatic steering control navigation. An autonomous vehicle may readily benefit from being able to correlate the shape of detected landmarks with the main direction of the road. This simplifies the navigation for an autonomous vehicle. It may also provide important information on when landmarks are not approved for landmark navigation. Just as a matter of example, if a request for approved landmarks in the ambient neighborhood of the vehicle is requested, and the replied answer is zero available approved landmarks, the autonomous vehicle is informed of that it must rely on other navigation data. As such, it may find that it is appropriate to slow down as the available navigation data is limited. The method may thus advantageously be implemented on at least one autonomous vehicle, preferably on a plurality of autonomous vehicles, preferably using a crowdsourcing gathering process. It should be noted of course that the crowdsourcing gathering process is preferably restricted to a group of individuals having a vehicle with a navigation device operable to perform the method disclosed herein.

The method may comprise the step of providing a zone in an approved section of a road, or in a landmark, that is identified as inappropriate for landmark navigation. It should be noted that landmarks, such as a road barrier, may extend along a road for several kilometers. It may be that although the specific landmark has been approved for landmark navigation, there may be sections of the landmark which are clearly not suitable for landmark navigation such as section at which the road barrier has been deformed e.g., during a vehicle accident. The method may compensate for this may having zones within the approved landmark, or within an approved section of the road which is deemed to be not appropriate for landmark navigation.

It may be advantageous to use threshold levels before approving or disapproving a landmark. Just as a matter of example, a landmark may be approved a predetermined number of times before the landmark is designated as an approved landmark for landmark navigation, or the section of the road is approved for landmark navigation. The predetermined number of times may be 5 or more, 10 or more, 20 or more for example.

Further disclosed herein is a navigation device for performing the method. Further disclosed herein; a vehicle comprising a navigation device, the vehicle is preferably an autonomous vehicle.

It is also within the boundaries of the present disclosure to provide a computer program for performing the method when the computer program is run on a computer and a computer readable medium carrying the computer program.

Optionally, before a landmark is designated as being approved, it may be required that a predetermined number of individual approvals have been issued.

BRIEF DESCRIPTION OF THE DRAWINGS

Non-limiting embodiments of the present disclosure are described in greater detail with reference to the accompanying drawings in which.

DETAILED DESCRIPTION

As required, detailed embodiments are disclosed herein; however, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

Figure 1:
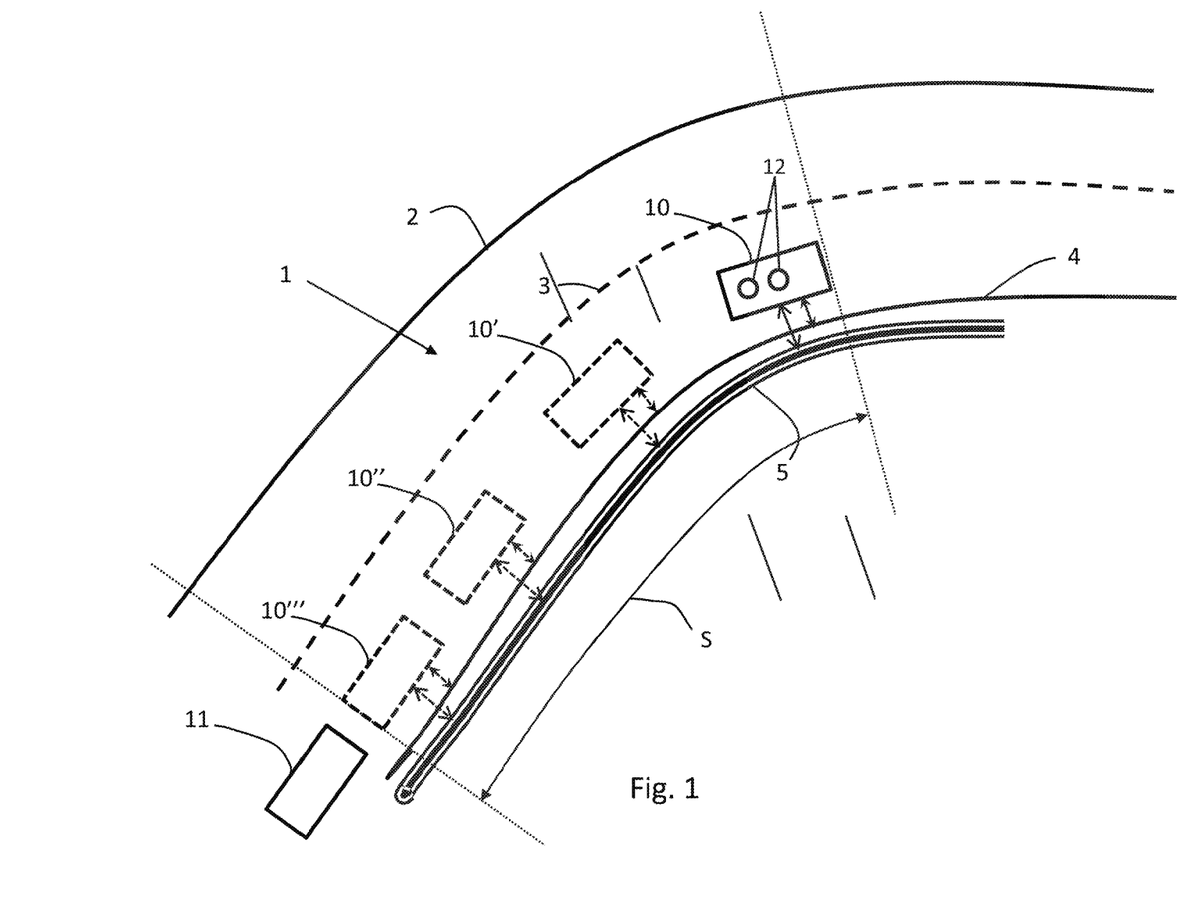
FIG. 1 shows a vehicle with a view from above and which has travelled along a landmark in the form of a road barrier detecting the distance between the road barrier and the road side line to correlate the shape of the road barrier with the main direction of the road.

FIG. 1 shows with a view form above a road 1, defining a route, having a left and a right side line 2, and a dashed center line 3. A vehicle 10 in the form of an automobile is travelling along the right side of the road 1. Along the road 1 is a landmark in the form of a road barrier 5. The vehicle 10 has just recently travelled a distance along the road 1 as shown by the vehicle 10', 10", 10''' illustrated with dashed lines. The vehicle 10 comprises a set of sensors 12. The vehicle 10 is provided with a navigation device comprising a processing unit such as a central processing unit (CPU) connected to a user interface such as a touch screen and audio capabilities and, a storage unit such as a hard disk. A communication unit enables the vehicle to communicate the navigation data to a third party. The navigation device performs navigation processing including assessing suitable routes, guidance to a driver and assessing gathered navigation data. The navigation device is a landmark navigation device specifically adapted for landmark navigation alone or as a complement to other navigation devices such as a GPS device for example. The navigation device may be integrated with the vehicle or a personal navigation device such as a mobile phone, laptop or think pad.

The sensors 12 may be one or more of the following sensors: radar such as long range radar (LRR), short range radar (SRR), infrared (IR), video, light detection and ranging (LIDAR), ultrasonic (US), laser, optic, camera using image recognition or the like. The sensors may form part of a lane departure waring system, parking assistance system, brake assistance system, collision avoidance system, adaptive cruise control system, cross traffic alert system, self-parking system, side impact system, blind spot detection system, lane change assistance system and/or parking vision system, GPS system.

The method below will be described with the reference to LIDAR. LIDAR uses a laser range finder. The LIDAR has an array of laser beams, which camera creates a 3D image of the object. The LIDAR calculates the distance to the object from the moving vehicle based on the time it takes for the laser beams to travel back and forth from the vehicle and the detected object. Objects as far as about 200 meters away from the vehicle may be measured in this manner. A LIDAR may fire up to 150.000 pulses a second. A lane departure warning system is further used. It should be noted that other systems may be used of course.

Landmarks can be substantially any identifiable stationary object along a route. By the term "stationary" is meant that the stationary object not displaceable by means of its function such as a parked vehicle or trailer. Preferably, the term "landmark" as used herein is restricted to one or more stationary objects selected from the list of; buildings such as stores, banks, gas stations, living quarters & residents; guardrails; road barriers; road safety fences; vehicle restraints systems; road concrete blocks; streetlights and/or; walls.

The vehicle 10 uses a method for generating navigation data for a vehicle. The method is preferably used during a crowdsourcing data gathering process. The generated navigation data can be stored locally in the vehicle 10 and/or be relayed to a cloud, data base, another vehicle, server or the like via the communication unit of the vehicle. As the vehicle 10 travels along a route, hereafter referred to as a road, the vehicle continuously detects the distance to the road barrier 5 as indicated with the dashed arrow between the vehicle 10, 10', 10", 10''' and the road barrier 5. Via lane departure warning system, a reference measurement can be done, providing an indicative measurement of the shape of the road 1. As will be described below, other measurements may be done to provide data about the shape of the road. Just as a matter of example GPS data, vehicle steering angle, and yaw rate may be used. The number of measurements is in all cases of course adapted so that sufficient data can be gathered.

As can be seen in FIG. 1, the road barrier 5 has the same shape as the main direction of the road 1. The road barrier 5 follows the main direction of the road 1 in terms of that the curvature of the road barrier 5 follows the curvature of the road 1. The measurements by the vehicle 10 will thus reveal that the distance between the vehicle 10 and the road barrier 5 is substantially constant. It may generally be assumed that the vehicle 10 travels approximately in the middle of the right lane during the measurements, hence smaller deviations may of course occur during the measurements. As a safe guard, the vehicles 10 distance to the right side line 4 is measured as indicated by the smaller arrows between the ride side line 4 and the vehicle 10, 10', 10", 10'''. The distance between the road barrier 5 and the right side line 4 can now easily be determined and any swaying of the vehicle 10 relative to the road can be nullified. The correlation between the shape of the road barrier 5 and the main direction of the road 1 may thus be established.

The navigation data may be processed by the vehicle on-board computer, or by a remote computer. If the road barrier 5 is determined to have a shape that correlates to the main direction of the road, the road barrier 5 is approved as being a road barrier on which landmark navigation may be permitted. Optionally or additionally, a section of the road 1, indicated by the arrow S in FIG. 1, is approved for landmark navigation. By approving the landmark, in this case the road barrier 5, or a section of the road 1, for landmark navigation, other vehicles may benefit from this data.

FIG. 1 also shows a second vehicle 11. The second vehicle 11 which is similar to the first vehicle 10, may use a navigation system, such as a GPS system, and a set of sensors for providing navigation data. The second vehicle 11 may, by receiving that the road barrier 5 has been approved for landmark navigation, rely on those measurements to a further extent than what would be otherwise appropriate.

Figure 2:
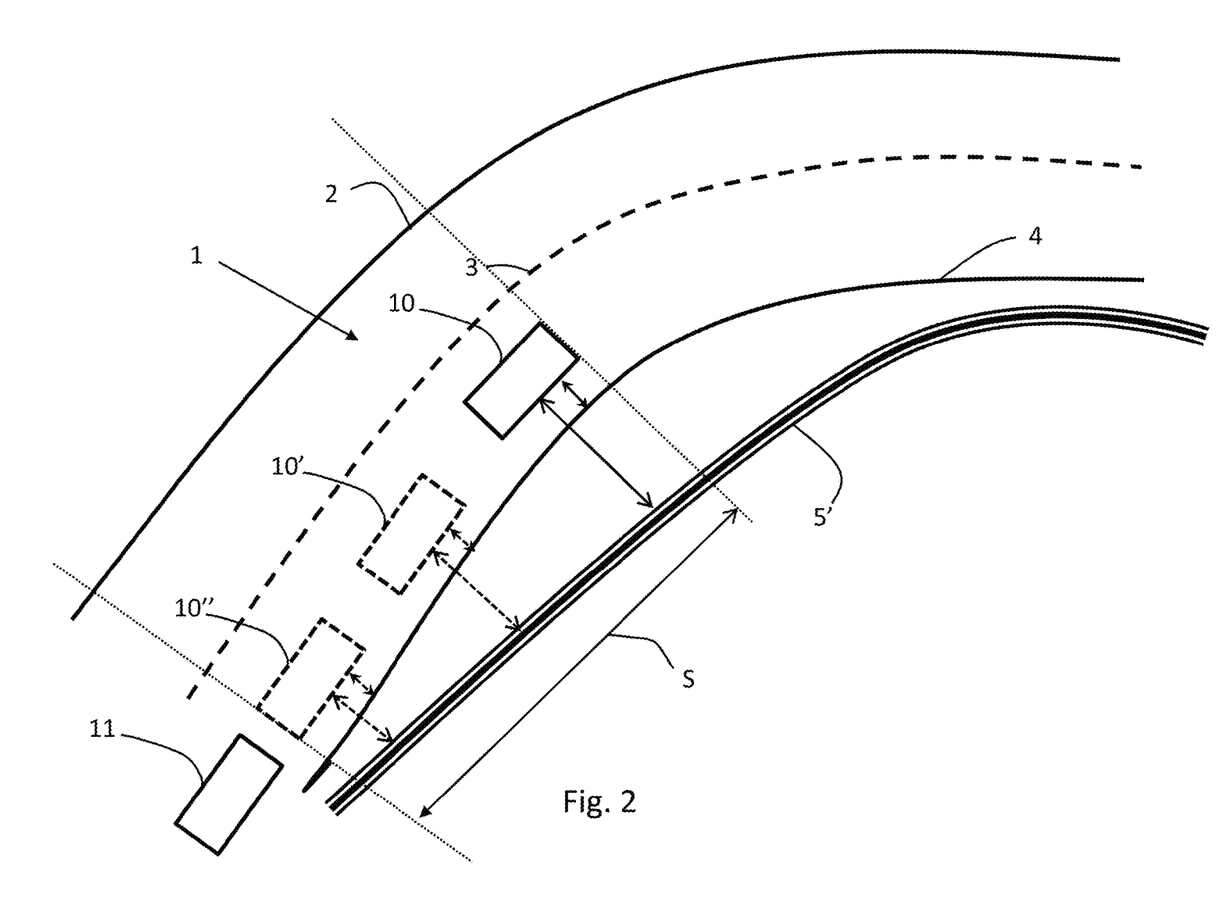
FIG. 2 shows a vehicle with a view from above and which has travelled along a landmark in the form of a road barrier detecting the deviating distance between the road barrier and the road side line to correlate the shape of the road barrier with the main direction of the road.

FIG. 2 shows a view from above the same as FIG. 1 but with the exception of that the landmark, in this case another road section of the road 1 having a road barrier 5'. As can be seen, the road barrier 5' does not follow the main direction of the road 1 but rather deviates from the road 5 to thereafter return to the proximity of the road 1. The vehicle 10 measures in a similar manner as described above. In this case the distance between the vehicle 10 and the road barrier 5' is continuously increasing as is indicated by the arrows between the vehicle 10, 10', 10" and the road barrier 5'. The on-board computer of the vehicle 10 will recognize that the shape of this landmark, i.e., the shape of the road barrier 5', in this section of the road 1, deviates from the main direction of the road. However, the shape of the road barrier 5' can still be correlated to the main direction of the road e.g., using a compensation factor. In this case, this landmark, or section of the road 1 may still be approved for landmark navigation.

FIG. 2 also shows the second vehicle 11. Again, the second vehicle 11 may, by receiving that the road barrier 5' has been approved for landmark navigation, rely on the vehicles own landmark navigation data which is collected to a further extent than what would be otherwise appropriate. The second vehicle 11 may for also confirm the deviating shape of the road barrier 5', and thus confirming the approval of the landmark, or section of the road for landmark navigation.

Figure 3:
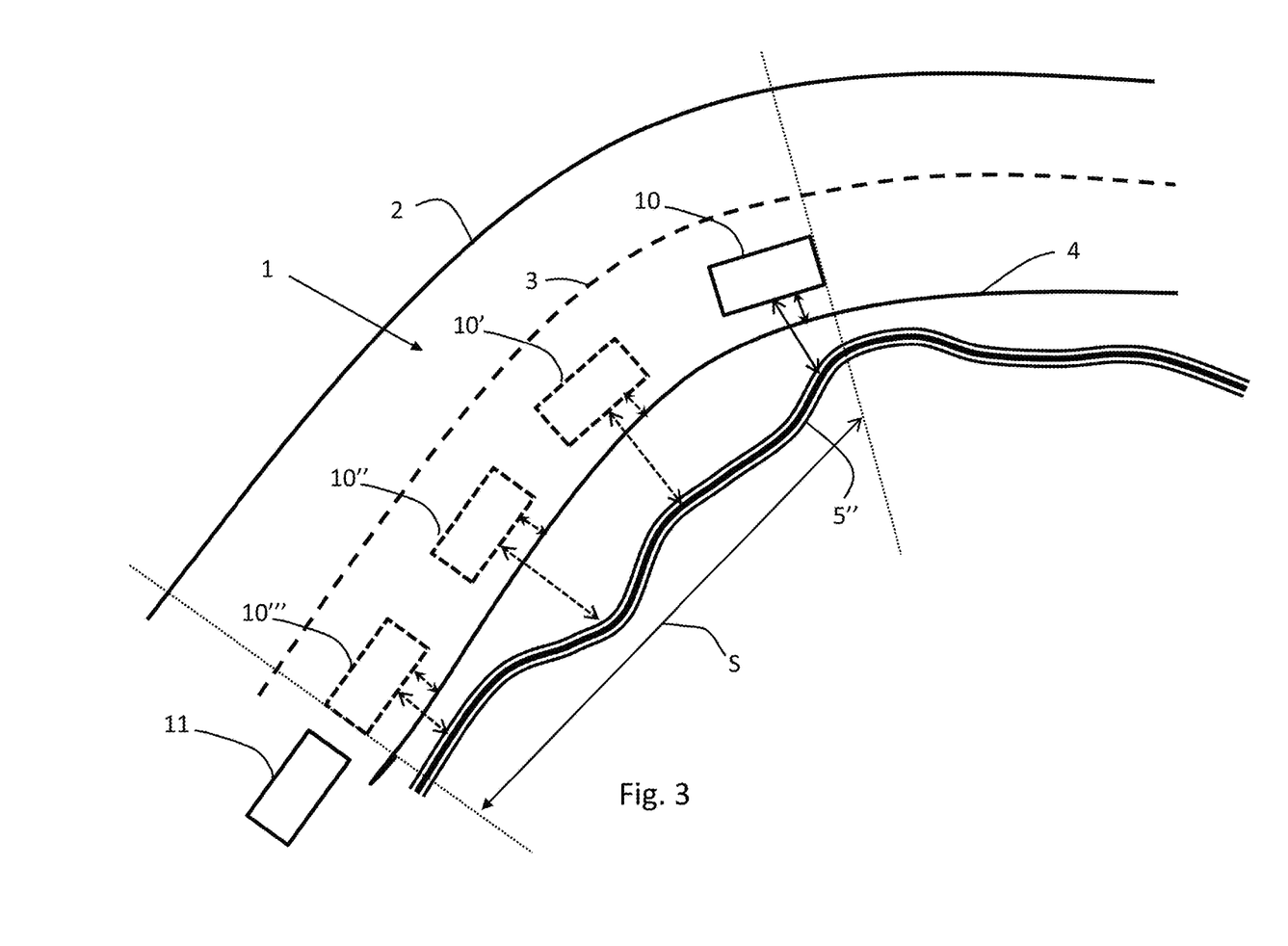
FIG. 3 shows a vehicle with a view from above and which has travelled along a landmark in the form of a road barrier detecting the distance between the road barrier and the road side line forming an identifiable distance profile to correlate the shape of the road barrier with the main direction of the road.

FIG. 3 shows a view from above the same as FIG. 1 but with the exception of that the landmark, in this case a third section of the road having road barrier 5" with an irregular shape. In this case measurements are performed along the road barrier 5" collecting data about the distances between the vehicle 10 and the road barrier 5". The collected data can be used to create an image of the road barrier 5", or to create a distance profile of the road barrier 5". The landmark, i.e., the road barrier 5", may thus still be approved or the section of the road 1 may still be approved for landmark navigation.

FIG. 3 further shows the second vehicle 11. The second vehicle 11 may, by receiving that the road barrier 5" has been approved for landmark navigation, rely on the vehicles own landmark navigation data which is collected when travelling to a further extent than what would be otherwise appropriate. As the second vehicle 11 collects data, the distance profile of the road barrier 5" may be identified. The second vehicle 11 may thus identify at which section of the road it travels, and even which landmark that has been detected, by measuring the distance to the road barrier 5", and compare the measurements with stored measurements. If the measured distances conform e.g., with a stored distance profile and optionally substantially at the same GPS position, the landmark can be identified as reliable.

Figure 4:
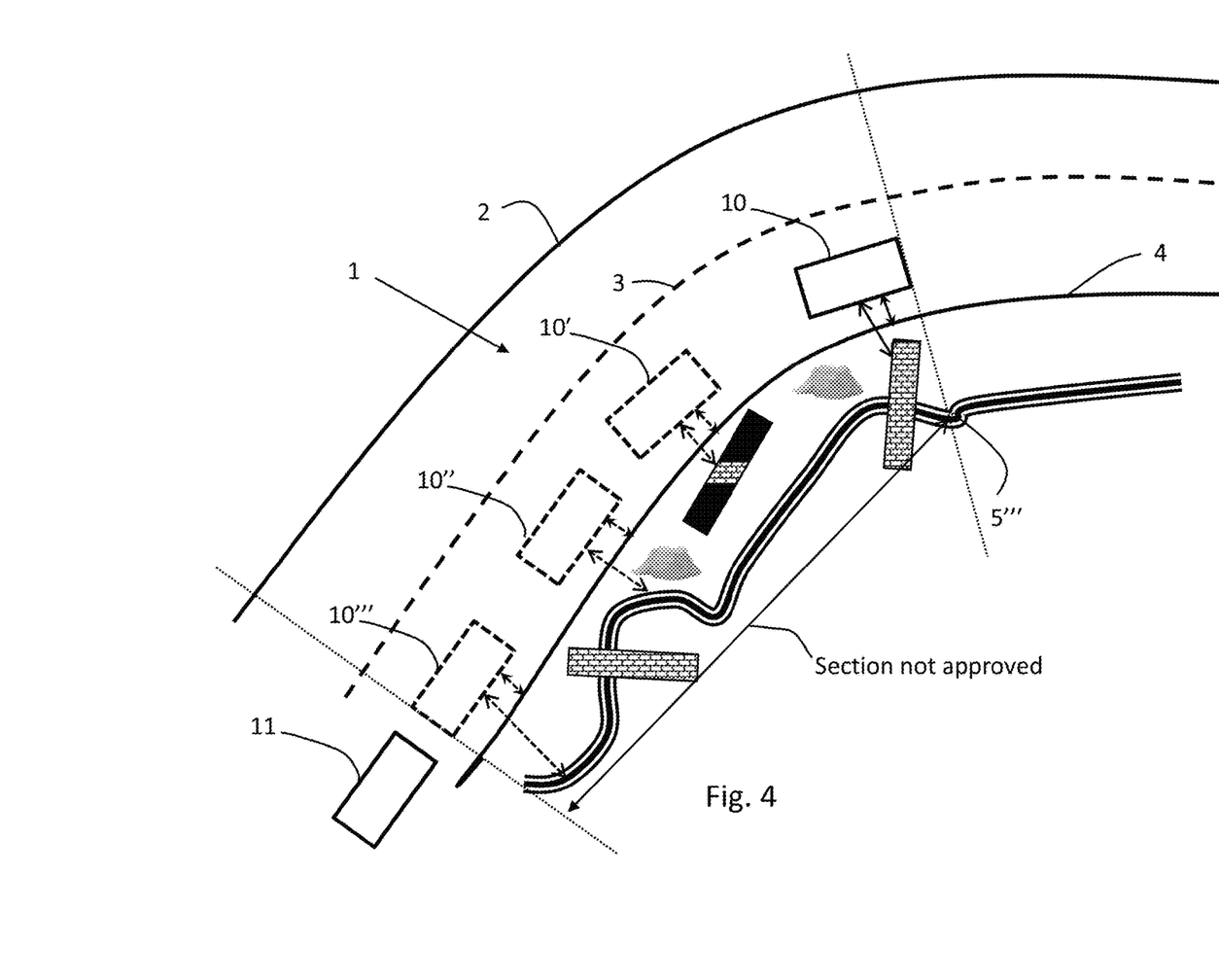
FIG. 4 shows a vehicle with a view from above and which has travelled along a landmark in the form of a road barrier detecting an irregular correlation between the road barrier and the road side line, rendering the road barrier unsuitable for landmark navigation.

FIG. 4 shows a view from above the same as FIG. 1 but with the exception that the landmark, in this case a fourth section of the road 1 having a road barrier 5''' with an irregular shape. The section of the road 1 has stones, and building material from road work. In this case measurements are performed along the road as the vehicle 10 travels and on portions of the road barrier 5'''. The collected data in this case reveals an inappropriate section of the road 1, or landmark, for landmark navigation. The landmark, i.e., the road barrier 5''', is in this case not approved for landmark navigation.

The second vehicle 11 can thus be taught that the upcoming section of the road 1 has landmarks that cannot be trusted for landmark navigation. The second vehicle 11 may thus need to rely on other navigation data than landmark navigation.

Figure 5:
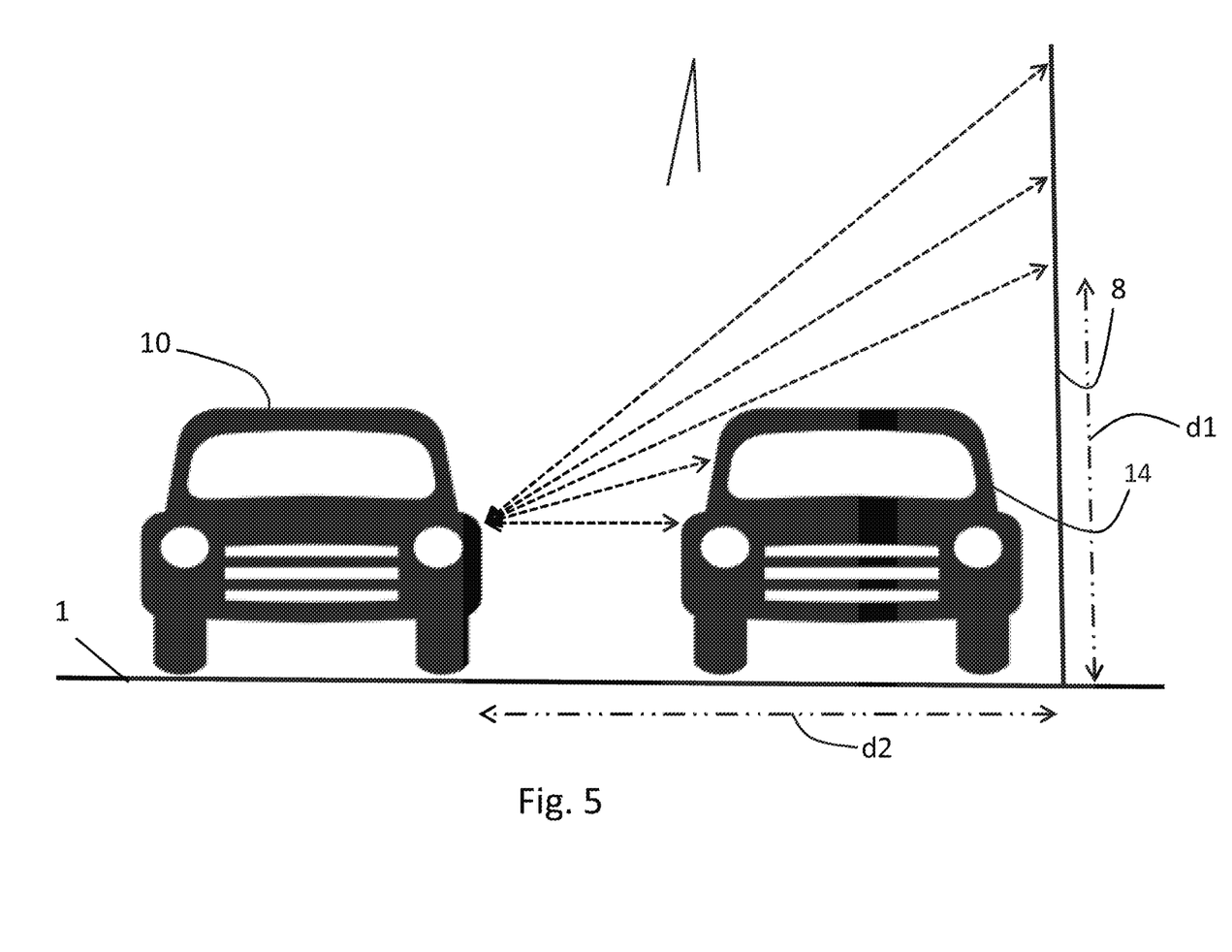
FIG. 5 shows a vehicle with a view towards the front of the vehicle and which has travelled along a landmark in the form of a building.

FIG. 5 shows the vehicle 10 with a view towards the front of the vehicle 10. A road 1 and a section of a house 8 are shown. A second parked vehicle 14 is also shown. When navigating in urban areas, the above method may be applied buildings as landmarks. Buildings are sometimes parallel with the main direction of the road and can thus be used for landmark navigation if approved. However, other parked vehicle may disrupt, or disturb, the measurements. FIG. 5 illustrates how a section of a road in an urban environment may still be approved for landmark navigation. In FIG. 5, the vehicle 10 measures along the road 1 at which it travels. The gathered data is processed and the on-board computer recognizes that a flat surface following the main direction of the road is detected. It is however noticed that in front of the detected flat surface irregularities are detected, in this case in the form of parked vehicles, such as the vehicle 14. By comparing the GPS position, and road information, the on-board computer collects data that the road 1 has parking lots. Hence landmark navigation is approved, but only for data collected above a specified vertical distance d1 from the road 1 or optionally at a specified horizontal distance d2 from the vehicle 10. Hence within an approved section of a road, or an approved landmark, for landmark navigation, it is advantageous sometimes to impose zones from which navigation data is not approved. There may thus be one or more sub-zones which are not approved for landmark navigation within an approved section, or landmark, for landmark navigation.

The different embodiments of the method described above, with reference to the accompanying figures, are advantageously implemented on autonomous vehicles. It is also possible that a landmark, or a section of a road, has to be approved a predetermined number of times before being relayed as an approved landmark or an approved section of a road for landmark navigation.

Turning back to FIG. 1; the road barrier 5 is advantageously approved for landmark navigation at least five times, preferably by five unique vehicles. Optionally or additionally, an approval of a landmark or of a section of a road may be time restricted. When implementing a time restriction on an approval, an approval may only have the status of being approved a maximum amount of time, such as 30 days, e.g., 30 unique 24 hour periods. If the landmark or the section of the road is not again approved within the specified period, the status is changed to not approved, or not evaluated.

Figure 6:
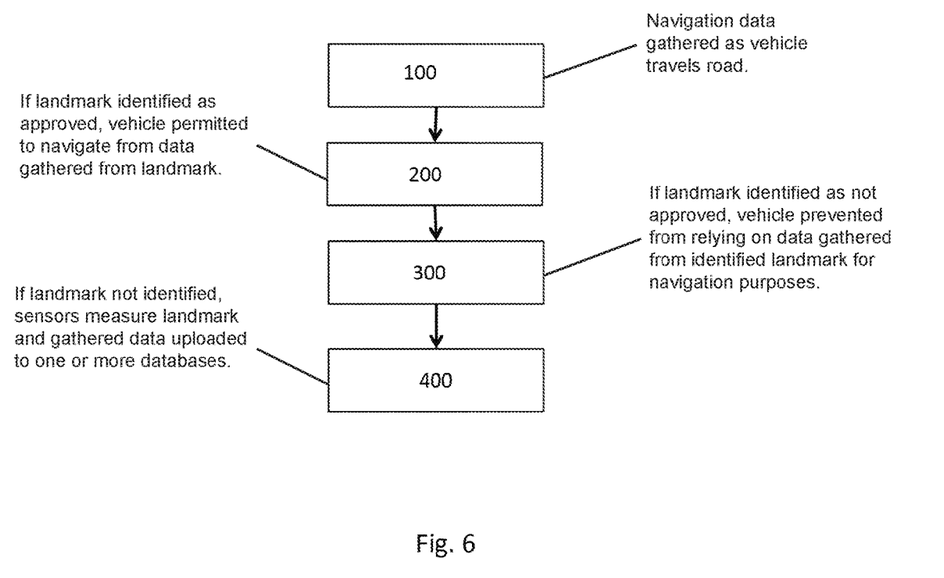
FIG. 6 shows a schematic process flow for performing the method according to an embodiment.

FIG. 6 shows a schematic process flow for a non-limiting embodiment of the method disclosed herein. With reference to FIG. 6;

100; navigation data is gathered as a vehicle travels along a road. The vehicle sensors identify that a landmark is present along the road, in this case in the form of a road fence extending along the road. The GPS position of the vehicle is established. The identified landmark is compared with approved landmarks in one or more databases and/or if the section on which the vehicle is travelling on an approved road section for landmark navigation.

200; if the landmark is identified as an approved landmark, the vehicle is permitted to navigate from data gathered from the landmark, i.e., the vehicle can base its navigation on the landmark.

300; if the landmark is identified as not approved, i.e., inappropriate for landmark navigation, the vehicle is prevented from relying for navigation purposes on the data gathered from the identified landmark.

400; if the landmark is not identified; the sensors measure the landmark and the gathered data is uploaded to the one or more databases. The data from the landmark is assessed and based on the assessment, the landmark is; approved; approved with restrictions such as having a not approved zone within the landmark or; not approved. It should be noted that this step may be performed even if the landmark has been identified earlier as the shape of a landmark may change and it may be desirable to have a continuously update of landmarks, even if the specific landmark is an approved landmark.

While exemplary embodiments are described above, it is not intended that these embodiments describe all possible forms of according to the disclosure. In that regard, the words used in the specification are words of description rather than limitation, and it is understood that various changes may be made without departing from the spirit and scope of the disclosure. Additionally, the features of various implementing embodiments may be combined to form further embodiments according to the disclosure.

What is claimed is:

1. A method for generating navigation data for a secondary autonomous or semi-autonomous vehicle using a first vehicle and a navigation device, the first vehicle comprising a set of sensors, the method comprising:
   a) travelling by the first vehicle along a road;
   b) detecting, by at least one of the sensors, at least one landmark;
   c) determining, by the navigation device, that the at least one landmark has a shape correlating to a main direction of the road;
   d) in response to determining that the at least one landmark has a shape correlating to the main direction of the road, approving, by the navigation device, the at least one landmark as a landmark for landmark navigation or approving, by the navigation device, a section of the road associated with the at least one landmark for landmark navigation; and
   e) storing navigation data indicative of the approved landmark for landmark navigation or the approved section of the road associated with the at least one landmark for landmark navigation in a database, cloud storage, or storage unit accessible by the secondary autonomous or semi-autonomous vehicle for landmark navigation by the secondary autonomous or semi-autonomous vehicle.

2. The method according to claim 1 further comprising determining that the at least one landmark does not to have a shape correlating to the main direction of the road, and storing the at least one landmark, or a section of the road associated with the at least one landmark, as inappropriate for landmark navigation.

3. The method according to claim 1 wherein in step c) the correlation is that the shape of the at least one landmark follows the main direction of the road.

4. The method according to claim 1 wherein the at least one landmark comprises a landmark selected from a guardrail, a road barrier, a road safety fence, a vehicle restraint system, a road concrete block, multiple streetlights, a building, a wall, or a road lane marking.

5. The method according to claim 1 wherein the main direction of the road is determined using a side line, a center line, global positioning system data, or vehicle data.

6. The method according to claim 1 wherein the main direction of the road is determined using vehicle data, and wherein the vehicle data comprises one or more of yaw rate, vehicle speed, or steering angle.

7. The method according to claim 1 wherein the main direction of the road directly correlates to the shape of the at least one landmark, or is correlated to the shape of the at least one landmark via a detected correlation including a coefficient, an equation or a distance profile.

8. The method according to claim 1 wherein the stored navigation data is used for autonomous vehicle navigation.

9. The method according to claim 1 wherein the method is based on a crowdsourcing data gathering process.

10. The method according to claim 1 further comprising providing a zone in a section of the road, or in a landmark, that is identified as inappropriate for landmark navigation.

11. The method according to claim 1 further comprising approving the at least one landmark a predetermined number of times as a landmark for landmark navigation, and designating the landmark as an approved landmark for landmark navigation or designating the associated section of the road as approved for landmark navigation.

12. A navigation device for generating navigation data for a secondary autonomous or semi-autonomous vehicle using a first vehicle traveling along a road, wherein the first vehicle comprises one or more sensors configured to detect a landmark, the navigation device comprising:
   a processing unit configured to determine that a landmark detected by the one or more sensors has a shape correlating to a main direction of the road, and to approve the landmark as a landmark for landmark navigation or to approve a section of the road associated with the landmark for landmark navigation; and
   a storage unit configured to store navigation data indicative of the approved landmark for landmark navigation or the approved section of the road associated with the landmark for landmark navigation, wherein the storage unit is accessible by the secondary autonomous or semi-autonomous vehicle for landmark navigation by the secondary autonomous or semi-autonomous vehicle.

13. A vehicle comprising a navigation device according to claim 12.

14. The vehicle according to claim 13 wherein the vehicle is an autonomous vehicle.

15. A non-transitory computer readable medium carrying a computer program that is executable by a computer to generate navigation data for a secondary autonomous or semi-autonomous vehicle using a first vehicle traveling along a road, wherein the first vehicle comprises one or more sensors for detecting a landmark, the computer program, when executed by the computer, causes the computer to:
   determine that a landmark detected by the one or more sensors has a shape correlating to a main direction of the road;
   in response to determining that the landmark has a shape correlating to the main direction of the road, approve the landmark as a landmark for landmark navigation or approve a section of the road associated with the landmark for landmark navigation; and
   store navigation data indicative of the approved landmark for landmark navigation or the approved section of the road associated with the landmark for landmark navigation in a database, cloud storage, or storage unit accessible by the secondary autonomous or semi-autonomous vehicle for landmark navigation by the secondary autonomous or semi-autonomous vehicle.

* * * * *

UNITED STATES PATENT AND TRADEMARK OFFICE
CERTIFICATE OF CORRECTION

| | | |
|---|---|---|
| PATENT NO. | : 10,436,599 B2 | Page 1 of 1 |
| APPLICATION NO. | : 15/486334 | |
| DATED | : October 8, 2019 | |
| INVENTOR(S) | : Joakim Lin Sorstedt et al. | |

It is certified that error appears in the above-identified patent and that said Letters Patent is hereby corrected as shown below:

In the Claims

Column 9, Line 40, Claim 2:
After "landmark does not"
Delete "to".

Signed and Sealed this
Seventeenth Day of March, 2020

Andrei Iancu
*Director of the United States Patent and Trademark Office*